(12) United States Patent  
Kazansky et al.

(10) Patent No.: US 10,168,778 B2  
(45) Date of Patent: Jan. 1, 2019

(54) USER STATUS INDICATOR OF AN AUGMENTED REALITY SYSTEM

(71) Applicant: DAQRI, LLC, Los Angeles, CA (US)

(72) Inventors: Lucas Kazansky, Los Angeles, CA (US); Sterling Crispin, Los Angeles, CA (US); Stefanie A. Hutka, Los Angeles, CA (US)

(73) Assignee: DAQRI, LLC, Los Angeles, CA (US)

(*) Notice: Subject to any disclaimer, the term of this patent is extended or adjusted under 35 U.S.C. 154(b) by 12 days.

(21) Appl. No.: 15/627,286

(22) Filed: Jun. 19, 2017

(65) Prior Publication Data

US 2017/0364153 A1    Dec. 21, 2017

Related U.S. Application Data

(60) Provisional application No. 62/352,484, filed on Jun. 20, 2016.

(51) Int. Cl.
| | |
|---|---|
| *G06T 19/00* | (2011.01) |
| *G06F 3/01* | (2006.01) |
| *G02B 27/01* | (2006.01) |
| *G08B 5/36* | (2006.01) |
| *G06F 3/03* | (2006.01) |

(52) U.S. Cl.  
CPC .......... *G06F 3/015* (2013.01); *G02B 27/017* (2013.01); *G02B 27/0172* (2013.01); *G06F 3/011* (2013.01); *G06F 3/013* (2013.01); *G06F 3/0304* (2013.01); *G06T 19/006* (2013.01); *G08B 5/36* (2013.01); *G02B 2027/014* (2013.01); *G02B 2027/0187* (2013.01); *G06F 2203/011* (2013.01)

(58) Field of Classification Search  
None  
See application file for complete search history.

(56) References Cited

U.S. PATENT DOCUMENTS

| | | | |
|---|---|---|---|
| 2014/0146394 A1* | 5/2014 | Tout | G09B 9/307 359/630 |
| 2016/0096075 A1* | 4/2016 | Leppanen | G06F 19/3481 434/247 |

* cited by examiner

*Primary Examiner* — Nicholas R Wilson  
(74) *Attorney, Agent, or Firm* — Schwegman Lundberg & Woessner, P.A.

(57) ABSTRACT

A device has a biometric sensor, a display, a light source, and a hardware processor. The biometric sensor measures biometric information of a user of the device. The display displays augmented reality (AR) content. The light source outputs a visual signal. The hardware processor performs operations comprising: identifying a task being performed by the user of the device, determining a disruption level based on a combination of the AR content, the task, and the biometric information, and generating, using the light source, the visual signal corresponding to the disruption level. The visual indicator visually alerts other users of other devices to avoid engaging the user of the device.

20 Claims, 8 Drawing Sheets

USER STATUS INDICATOR OF AN AUGMENTED REALITY SYSTEM

RELATED APPLICATION

This application claims the benefit of priority of U.S. Provisional Application No. 62/352,484 filed Jun. 20, 2016, which is herein incorporated by reference in its entirety.

TECHNICAL FIELD

The subject matter disclosed herein generally relates to a device, such as, a wearable, head mounted device. Example embodiments relate to systems and methods for determining a status of a user operating such a device in performing a specific task, and communicating the status via visual indications or augmented reality content.

BACKGROUND

An augmented reality (AR, hereafter) device generates and displays data in addition to an image captured with the AR device. For example, AR is a live, direct, or indirect view of a physical, real-world environment whose elements are augmented by computer-generated sensory input such as sound, video, graphics, Global Positioning System (GPS) data, or user's biometric data. With the help of advanced AR technology (e.g., adding computer vision and object recognition) the information about the surrounding real world of the user becomes interactive. Device-generated (e.g., artificial) information about the environment and its objects can be overlaid on the real world. An AR device utilizes visual wearable displays such as a head mounted display (HMD) to facilitate illustration and communication of these AR content and information. Some AR wearable devices are equipped with biometric sensors such as ocular cameras, electroencephalogram (EEG) detectors, electrocardiogram (ECG) detectors, body temperature monitors, or muscle tension sensors to measure users' mental and physical states.

One problem exists when a worker needs to focus on a task at hand during crucial working steps or procedures. This focused state of the worker is to be communicated to other workers to prevent interferences or distractions from other workers. Such interferences, if occur, may lead to critical task failures or potentially dangerous situations, and lower the productivity. A solution to efficiently detect and indicate this focused state has not been previously realized.

BRIEF DESCRIPTION OF THE DRAWINGS

Some embodiments are illustrated by way of example and not limitation in the figures of the accompanying drawings.

DETAILED DESCRIPTION

Figure 1:
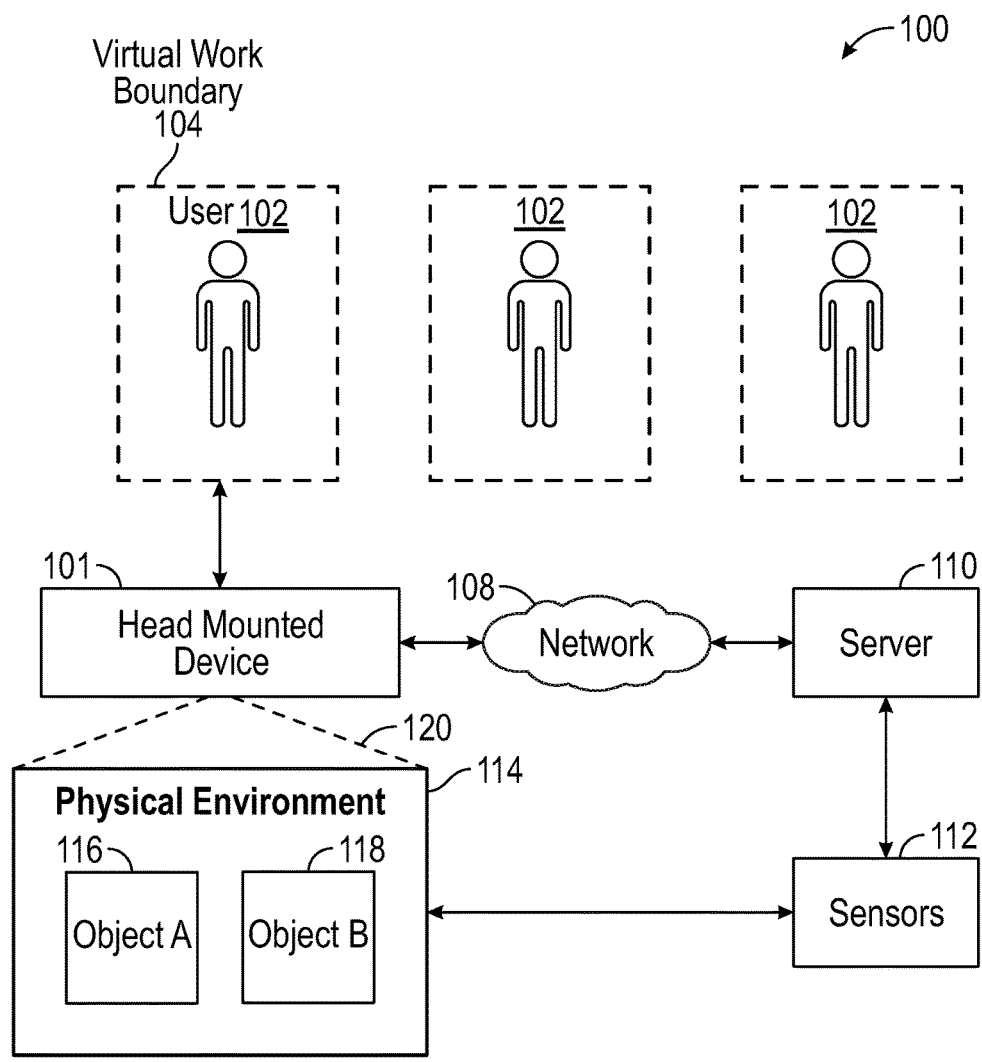
FIG. 1 is a block diagram illustrating an example of a network suitable for a head mounted device system, according to some example embodiments.

Example methods and systems are directed to determining a user's state (e.g., focused, distracted) when wearing a device. For example, the device includes a wearable device placed on a user's body, a head mounted display (HMD), or a human machine interface. A visual indicator (e.g., a light source) on the device generates a visual signal to other devices around the user based on the user's state. The visual signal identifies an interference state of the user. The interference states includes, for example, different levels of interferences (e.g., do not disturb, ok to talk to, talk to only if important). In one example, the visual indicator generates different light colors (e.g., red, yellow, green) based on the user's state (e.g., focused, distracted, relaxed). The visual signal is indicative of the user's state and enables other users to decide whether to contact or interfere with the user of the HMD based on certain conditions or events. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one example embodiment, a device has a biometric sensor, a display, a light source, and a disruption indicator application (implemented in one or more hardware processors). The biometric sensor is configured to measure biometric information of a user of the device. The display is configured to display augmented reality (AR) content. The light source is configured to output any of a plurality of visual signals. The disruption indicator application performs operations comprising:

identifying a task being performed by the user of the device;
determining a disruption level based on a combination of the AR content, the task, and the biometric information; and
causing the light source to output a visual signal corresponding to the disruption level and selected from the plurality of visual signals, the visual signal being configured to visually alert other users of other devices to avoid engaging the user of the device.

In another example embodiment, the device identifies, using a camera of the device, an eye gaze of the user of the device, wherein the disruption level is further determined based on the eye gaze of the user.

In another example embodiment, the biometric information includes a combination of a body temperature of the user, a heart rate of the user, electroencephalogram (EEG) data of the user, and an electrocardiogram (ECG) of the user.

In another example embodiment, the disruption level is determined based on a combination of a percentage of a surface area of the display that is used by the AR content, a complexity level of the task, and an engagement level of the user,
wherein the engagement level is based on the biometric information,
wherein a disruption level increases with a higher percentage of the surface area that is used by the AR content, a higher complexity level of the task, and a higher engagement level.

In another example embodiment, the device forms a geographical boundary based on the disruption level. The geographic boundary identifies an area for users of other devices to avoid, the area being centered around the user's geographic location, a larger area corresponding to a higher disruption level, and a smaller area corresponding to a lower disruption level.

In another example embodiment, the device communicates the geographical boundary to at least one of a second device and a server. The second device is configured to display a virtual boundary corresponding to the geographical boundary in a display of the second device, the virtual boundary appearing centered around the user's geographic location.

In another example embodiment, the visual signal includes light of one or more colors, each color corresponding to the disruption level.

In another example embodiment, the visual signal includes a flashing light with a frequency corresponding to the disruption level.

In another example embodiment, the visual signal includes light with an intensity corresponding to the disruption level.

In another example embodiment, the visual signal adjusts the disruption level based on a level of progress of the task.

In one example embodiment, a HMD includes a visual indicator, a helmet, a transparent display, a biometric sensor, and a processor. The transparent display includes lenses that are disposed in front of the user's eyes to display virtual objects. The biometric sensor includes, for example, an ocular camera attached to the transparent display and directed towards the eyes of the user. In another example, the biometric sensor includes EEG/ECG sensors disposed inside a perimeter of the helmet so that the EEG/ECG sensors connect to the forehead of the user when the helmet is worn. The biometric sensor generates biometric data (also referred to as biometric information) based on, for example, the blood vessel pattern in the retina of an eye of the user, the structure pattern of the iris of an eye of the user, the brain wave pattern of the user, or a combination thereof. The processor renders virtual objects in the transparent display, and records the biometric data of the user in response to the user looking at a corresponding virtual object. The processor authenticates the user based on the biometric data for the corresponding virtual objects. Once the user is authenticated, the user can view additional virtual objects. Different types of virtual objects may be assigned to different types of users. For example, once the HMD determines that the authenticated user is an executive of a company, the HMD provides the user with access to more sensitive documents and virtual objects that are displayed in the transparent display. In other example embodiments, the geographic location of the HMD may trigger an authentication process for the user of the HMD. For example, a GPS unit in the HMD may determine that the user is at a geographic location associated with virtual objects including sensitive material that may need authentication from the user to access the sensitive material.

The HMD may record biometric data of the user for each location of the virtual objects in the transparent display. For example, the HMD records a first set of biometric data of the user when the first virtual object is displayed in the top part of the transparent display. The HMD records a second set of biometric data of the user when the second virtual object is displayed in a bottom part of the transparent display.

Once the biometric data are recorded for the different locations, the HMD compares the biometric data of the user for each location of the virtual objects against reference biometric data of the user for the corresponding locations of the virtual objects to authenticate the user. For example, the HMD retrieves a first reference biometric data associated with the location of the first virtual object that was displayed in the top part of the transparent display. The HMD then compares the first reference biometric data with the recorded first set of biometric data of the user. The first reference biometric data may have been previously determined for the user. Similarly, the HMD retrieves a second reference biometric data associated with the location of the second virtual object that was displayed in the bottom part of the transparent display. The HMD then compares the second reference biometric data with the recorded second set of biometric data of the user. The second reference biometric data may also have been previously determined for the user. The user of the HMD is authenticated if at least one of the first and second reference biometric data matches the recorded first and second set of biometric data. In another example, the user of the HMD is authenticated if all reference biometric data matches all recorded sets of biometric data.

In another example embodiment, the HMD records the biometric data of the user for each different location of the virtual objects in the transparent display, and generates composite biometric data based on the biometric data of the user for the different locations of the virtual objects. For example, the composite biometric data may include an average of the biometric data for the different locations of the virtual objects. It will be appreciated that the composite biometric data may be computed using a variety of different algorithms (e.g., statistical algorithm, hash algorithm) applied to the biometric data for the different locations of the virtual objects. The HMD then compares the composite biometric data of the user against reference biometric data of the user. The reference biometric data of the user may have been previously generated and stored in the HMD during a configuration process. The user of the HMD is authenticated if the composite biometric data of the user matches the reference biometric data of the user.

The HMD may also render a series of different virtual objects during an authentication process. The HMD records the biometric data of the user for the series of different virtual objects displayed in the transparent display. For example, the HMD records a first set of biometric data of the user when the first virtual object is displayed in the transparent display. The HMD records a second set of biometric data of the user when the second virtual object is displayed in the transparent display.

Once the biometric data are recorded for the series of different virtual objects, the HMD compares the biometric data of the user for each virtual object against reference biometric data of the user for the corresponding virtual object to authenticate the user. For example, the HMD retrieves a first reference biometric data associated with the first virtual object displayed in the transparent display. The HMD then compares the first reference biometric data with the recorded first set of biometric data of the user. The first reference biometric data may have been previously computed for the user. Similarly, the HMD retrieves a second reference biometric data associated with the second virtual object that was displayed in the transparent display. The HMD then compares the second reference biometric data with the recorded second set of biometric data of the user. The second reference biometric data may have been previously generated for the user. The user of the HMD is authenticated if at least one of the first and second reference biometric data matches the recorded first and second set of biometric data. In another example, the user of the HMD is authenticated if all reference biometric data matches all recorded sets of biometric data.

In another example embodiment, the HMD records the biometric data of the user for the series of different virtual objects in the transparent display, and generates composite biometric data based on the biometric data of the user for the corresponding virtual object. For example, the composite biometric data may include an average of the biometric data for the series of different virtual objects. It will be appreciated that the composite biometric data may be computed using a variety of different algorithms applied to the biometric data for the series of different locations of the virtual objects. The HMD then compares the composite biometric data of the user against reference biometric data of the user. The reference biometric data of the user may have been previously computed and stored in the HMD. The user of the HMD is authenticated if the composite biometric data of the user matches the reference biometric data of the user.

In one example embodiment, the biometric data or biometric information may be used to determine an engagement level of the user: the level of focus (or distraction) of the user while performing a task.

In another example embodiment, the HMD includes an augmented reality (AR) application that identifies an object in an image captured with the camera, retrieves a three-dimensional model of a virtual object from the augmented reality content based on the identified object, and renders the three-dimensional model of the virtual object in the transparent display lens. The virtual object is perceived as an overlay on the real world object.

The HMD may include a helmet with a display surface that can be retracted inside the helmet and extended outside the helmet to allow a user to view the display surface. The position of the display surface may be adjusted based on an eye level of the user. The display surface includes a display lens capable of displaying augmented reality (AR) content. The helmet may include a computing device such as a hardware processor with an AR application that allows the user wearing the helmet to experience information, such as in the form of a virtual object such as a three-dimensional (3D) virtual object overlaid on an image or a view of a physical object (e.g., a gauge) captured with a camera in the helmet. The helmet may include optical sensors. The physical object may include a visual reference (e.g., a recognized image, pattern, or object, or unknown objects) that the AR application can identify using predefined objects or machine vision. A visualization of the additional information (also referred to as AR content), such as the 3D virtual object overlaid or engaged with a view or an image of the physical object, is generated in the display lens of the helmet. The display lens may be transparent to allow the user to see through the display lens. The display lens may be part of a visor or face shield of the helmet or may operate independently from the visor of the helmet. The 3D virtual object may be selected based on the recognized visual reference or captured image of the physical object. A rendering of the visualization of the 3D virtual object may be based on a position of the display relative to the visual reference. Other AR applications allow the user to experience visualization of the additional information overlaid on top of a view or an image of any object in the real physical world. The virtual object may include a 3D virtual object and/or a two-dimensional (2D) virtual object. For example, the 3D virtual object may include a 3D view of an engine part or an animation. The 2D virtual object may include a 2D view of a dialog box, menu, or written information such as statistics information for properties or physical characteristics of the corresponding physical object (e.g., temperature, mass, velocity, tension, stress). The AR content (e.g., image of the virtual object, virtual menu) may be rendered at the helmet or at a server in communication with the helmet. In one example embodiment, the user of the helmet may navigate the AR content using audio and visual inputs captured at the helmet or other inputs from other devices, such as a wearable device. For example, the display lenses may extract or retract based on a voice command of the user, a gesture of the user, a position of a watch in communication with the helmet, etc.

In another example embodiment, a non-transitory machine-readable storage device may store a set of instructions that, when executed by at least one processor, causes the at least one processor to perform the method operations discussed within the present disclosure.

Figure 10:
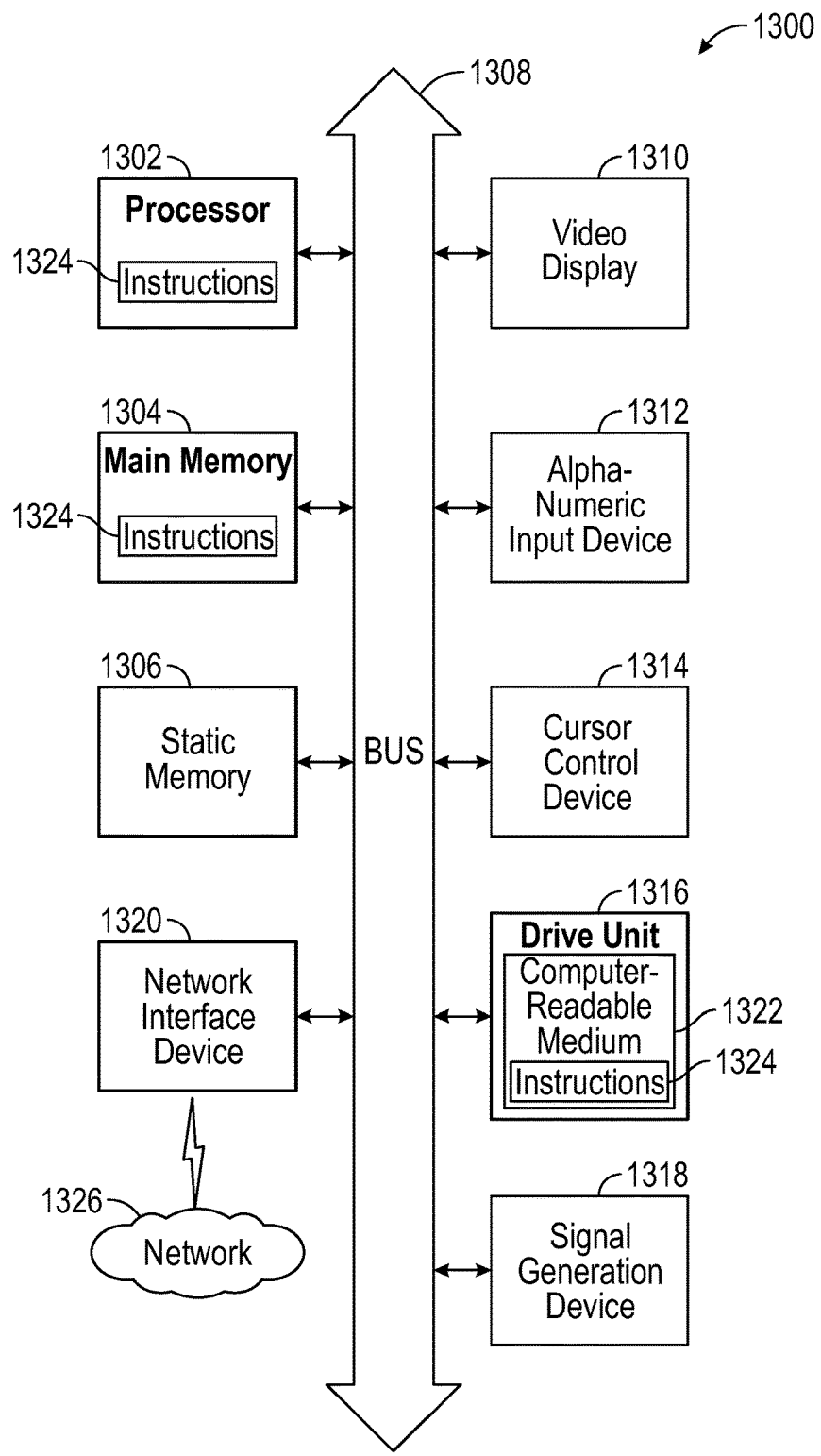
FIG. 10 is a block diagram illustrating components of a machine, according to some example embodiments, able to read instructions from a machine-readable medium and perform any one or more of the methodologies discussed herein.

FIG. 1 is a network diagram illustrating a network environment 100 suitable for operating an AR application of a HMD with display lenses, according to some example embodiments. The network environment 100 includes a HMD 101 and a server 110, communicatively coupled to each other via a network 108. The HMD 101 and the server 110 may each be implemented in a computer system, in whole or in part, as described below with respect to FIG. 10.

A virtual work boundary (e.g., predefined space around each user) may be determined based on a task of the user, the state of the user, and other parameters as determined by the sensors in the HMDs and sensors 112 external to the HMDs. For example, the area of virtual work boundary may increase when the state of the user indicates that the user is deeply focused on a task. The area of the virtual work boundary may also vary based on a level of difficulty of the task (e.g., larger virtual work boundary for more difficult task). The virtual work boundary may include, for example, an area within a predetermined radius of the user. Virtual work boundary may intersect between workers/users as they move around. An alert may be generated at the corresponding HMDs when the virtual work boundary intersect or are about to intersect. The virtual work boundary of one HMD may be visualized on another HMD. For example, a first HMD user may see a virtual boundary line or colored area on a floor around another HMD user.

The server 110 may be part of a network-based system. For example, the network-based system may be or include a cloud-based server system that provides AR content (e.g., augmented information including 3D models of virtual objects related to physical objects captured by the HMD 101) to the HMD 101.

The HMD 101 may include a helmet that a user 102 may wear to view the AR content related to captured images of several physical objects (e.g., object A 116, object B 118) in a real-world physical environment 114. In one example embodiment, the HMD 101 includes a computing device with a camera and a display (e.g., smart glasses, smart helmet, smart visor, smart face shield, smart contact lenses). The computing device may be removably mounted to the head of the user 102. In one example, the display may be a screen that displays what is captured with a camera of the HMD 101. In another example, the display of the HMD 101 may be transparent, such as in the visor or face shield of a helmet, or a display lens distinct from the visor or face shield of the helmet.

The user 102 may be a user of an AR application in the HMD 101 and at the server 110. The user 102 may be a human user (e.g., a human being), a machine user (e.g., a computer configured by a software program to interact with the HMD 101), or any suitable combination thereof (e.g., a human assisted by a machine or a machine supervised by a human). The user 102 is not part of the network environment 100, but is associated with the HMD 101. The AR application may provide the user 102 with an AR experience triggered by identified objects in the physical environment 114. The physical environment 114 may include identifiable objects such as a 2D physical object (e.g., a picture), a 3D physical object (e.g., a factory machine), a location (e.g., at the bottom floor of a factory), or any references (e.g., perceived corners of walls or furniture) in the real-world physical environment 114. The AR application may include computer vision recognition to determine corners, objects, lines, and letters. The user 102 may point a camera of the HMD 101 to capture an image of the objects A 116 and B 118 in the physical environment 114.

In one example embodiment, the objects A 116, B 118 in the image are tracked and recognized locally in the HMD 101 using a local context recognition dataset or any other previously stored dataset of the AR application of the HMD 101. The local context recognition dataset module may include a library of virtual objects associated with real-world physical objects A 116, B 118 or references. In one example, the HMD 101 identifies feature points in an image of the objects A 116, B 118 to determine different planes (e.g., edges, corners, surface, dial, letters). The HMD 101 may also identify tracking data related to the objects A 116, B 118 (e.g., GPS location of the HMD 101, orientation, distances to objects A 116, B 118). If the captured image is not recognized locally at the HMD 101, the HMD 101 can download additional information (e.g., 3D model or other augmented data) corresponding to the captured image, from a database of the server 110 over the network 108.

In another embodiment, the objects A 116, B 118 in the image are tracked and recognized remotely at the server 110 using a remote context recognition dataset or any other previously stored dataset of an AR application in the server 110. The remote context recognition dataset module may include a library of virtual objects or augmented information associated with real-world physical objects A 116, B 118 or references.

Sensors 112 may be associated with, coupled to, or related to the objects A 116 and B 118 in the physical environment 114 to measure a location, information, or captured readings from the objects A 116 and B 118. Examples of captured readings may include, but are not limited to, weight, pressure, temperature, velocity, direction, position, intrinsic and extrinsic properties, acceleration, and dimensions. For example, sensors 112 may be disposed throughout a factory floor to measure movement, pressure, orientation, and temperature. The server 110 can compute readings from data generated by the sensors 112. The server 110 can generate virtual indicators such as vectors or colors based on data from sensors 112. Virtual indicators are then overlaid on top of a live image of the objects A 116 and B 118 to show data related to the objects A 116 and B 118. For example, the virtual indicators may include arrows with shapes and colors that change based on real-time data. The visualization may be provided to the HMD 101 so that the HMD 101 can render the virtual indicators in a display of the HMD 101. In another embodiment, the virtual indicators are rendered at the server 110 and streamed to the HMD 101. The HMD 101 displays the virtual indicators or visualization corresponding to a display of the physical environment 114 (e.g., data is visually perceived as displayed adjacent to the objects A 116 and B 118).

The sensors 112 may include other sensors used to track the location, movement, and orientation of the HMD 101 externally without having to rely on the sensors 112 internal to the HMD 101. The sensors 112 may include optical sensors (e.g., depth-enabled 3D camera), wireless sensors (Bluetooth, Wi-Fi), GPS sensor, and audio sensors to determine the location of the user 102 having the HMD 101, distance of the user 102 to the tracking sensors 112 in the physical environment 114 (e.g., sensors 112 placed in corners of a venue or a room), the orientation of the HMD 101 to track what the user 102 is looking at (e.g., direction at which the HMD 101 is pointed, HMD 101 pointed towards a player on a tennis court, HMD 101 pointed at a person in a room).

In another embodiment, data from the sensors 112 and internal sensors in the HMD 101 may be used for analytics data processing at the server 110 (or another server) for analysis on usage and how the user 102 is interacting with the physical environment 114. Live data from other servers may also be used in the analytics data processing. For example, the analytics data may track at what locations (e.g., points or features) on the physical or virtual object the user 102 has looked, how long the user 102 has looked at each location on the physical or virtual object, how the user 102 moved with the HMD 101 when looking at the physical or virtual object, which features of the virtual object the user 102 interacted with (e.g., such as whether a user 102 tapped on a link in the virtual object), and any suitable combination thereof. The HMD 101 receives a visualization content dataset related to the analytics data. The HMD 101 then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 6. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices may be combined into a single machine, and the functions described herein for any single machine, database, or device may be subdivided among multiple machines, databases, or devices.

The network 108 may be any network that enables communication between or among machines (e.g., the server 110), databases, and devices (e.g., HMD 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
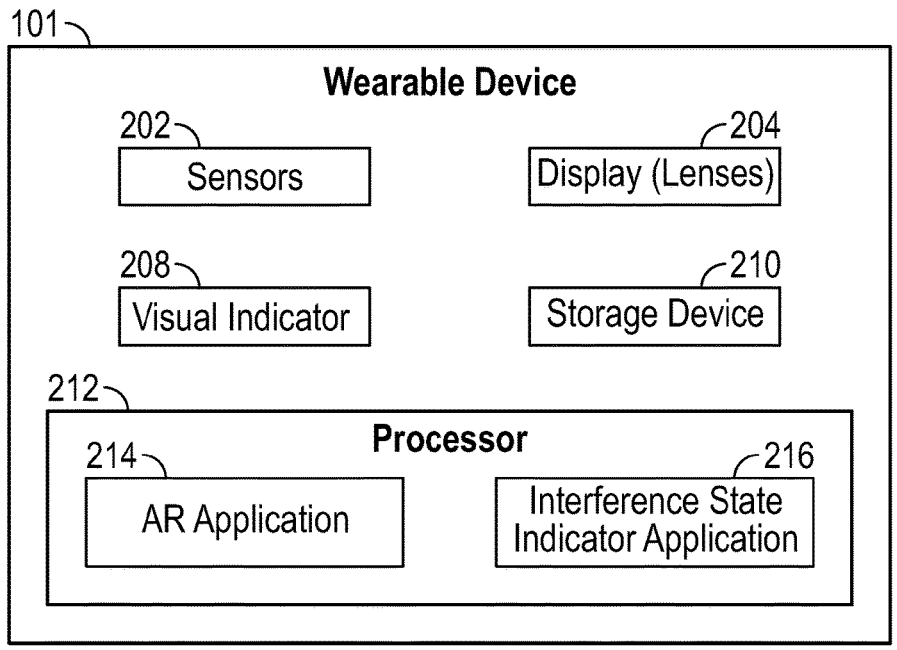
FIG. 2 is a block diagram illustrating an example embodiment of a wearable device.

FIG. 2 is a block diagram illustrating modules (e.g., components) of the HMD 101 (wearable device), according to some example embodiments. The HMD 101 may be a helmet that includes sensors 202, a display 204, a visual indicator 208, storage device 210, and a processor 212. The HMD 101 may not be limited to a helmet and may include any type of device that can be worn on the head of a user, such as a headband, a hat, or a visor.

The sensors 202 may be used to generate internal tracking data of the HMD 101 to determine a position and an orientation of the HMD 101. The position and the orientation of the HMD 101 may be used to identify real-world objects in a field of view of the HMD 101. For example, a virtual object may be rendered and displayed in the display 204 when the sensors 202 indicate that the HMD 101 is oriented towards a real-world object (e.g., when the user 102 looks at object A 116) or in a particular direction (e.g., when the user 102 tilts his head to watch his wrist). The HMD 101 may display a virtual object also based on a geographic location of the HMD 101. For example, a set of virtual objects may be accessible when the user 102 of the HMD 101 is located in a particular building. In another example, virtual objects, including sensitive material, may be accessible when the user 102 of the HMD 101 is located within a predefined area associated with the sensitive material and the user 102 is authenticated. Different levels of content of the virtual objects may be accessible based on a credential level of the user 102. For example, a user who is an executive of a company may have access to more information or content in the virtual objects than a manager at the same company. The sensors 202 may be used to authenticate the user 102 prior to providing the user 102 with access to the sensitive material (e.g., information displayed in as a virtual object such as a virtual dialog box in a transparent display). Authentication may be achieved via a variety of methods such as providing a password or an authentication token, or using sensors 202 to determine biometric data unique to the user 102. The biometric method is explained in more detail below.

The processor 212 may include an AR application 214 and an interference status unit 216. The AR application 214 generates a display of information related to the objects A 116, B 118. In one example embodiment, the AR application 214 generates a visualization of information related to the objects A 116, B 118 when the HMD 101 captures an image of the objects A 116, B 118 and recognizes the objects A 116, B 118, or when the HMD 101 is in proximity to the objects A 116, B 118. For example, the AR application 214 generates a display of a holographic or virtual menu visually perceived as a layer on the objects A 116, B 118.

The interference state indicator application 216 determines a disruption level that identifies whether the user is not to be disturbed based on the focus level of the user, and the difficulty of the task of the user. The disruption level may increase when the user focus level and difficulty of the task increase. Alternatively, the disruption level may decrease when the user focus level and difficulty of the task increase. The focus level of the user may be determined based on biometric data measured from the sensors 202. In another example embodiment, the focus level may be determined based on the percentage of the display occupied by virtual content. For example, a display filled up with virtual content requires more attention from the user than a display with little virtual content.

The task may be identified by the user when the user selects a task operation or application (e.g., replace component X of machine A) within the AR application 214. The task may also be identified based on sensor data from sensors 202 (e.g., location of the user, identity of the user, time of operation, assigned task to the HMD from a server, computer-vision techniques to identify physical objects within a predefined radius of the user and identify a corresponding task).

The interference state indicator application 216 then computes an output to generate a visual signal using the visual indicator (e.g., red light on top of a helmet) or a wireless signal to other nearby HMD/server based on detection of a focus level of the task of the user. One example of a flowchart is discussed further in connection with FIG. 4 and the resulting output display in connection with FIG. 6.

The visual indicator 208 includes for example an LED that generates different colors or includes different signal light patterns/states of the head mounted device 101, that communicate the interference status of the task of the user 102 to other users, according to some example embodiments. For example, the HMD could have a visual indicator LED display on a predetermined location (e.g., top or side of the helmet externally visible from other users). Based on the interference status detection as determined by the sensors and flowchart depicted in connection with FIG. 4, an interference prevention indication could be displayed with a red LED. Other LED indicators could be based on different levels of interference status, such as, a yellow LED for only disturb if an important condition. In contrast, a green LED indicates the user is available. Another example embodiment includes generating AR content (e.g., an exclamation point in flashing red color background) in the display of other nearby HMDs to indicate that the user should not be interrupted.

Figure 3:
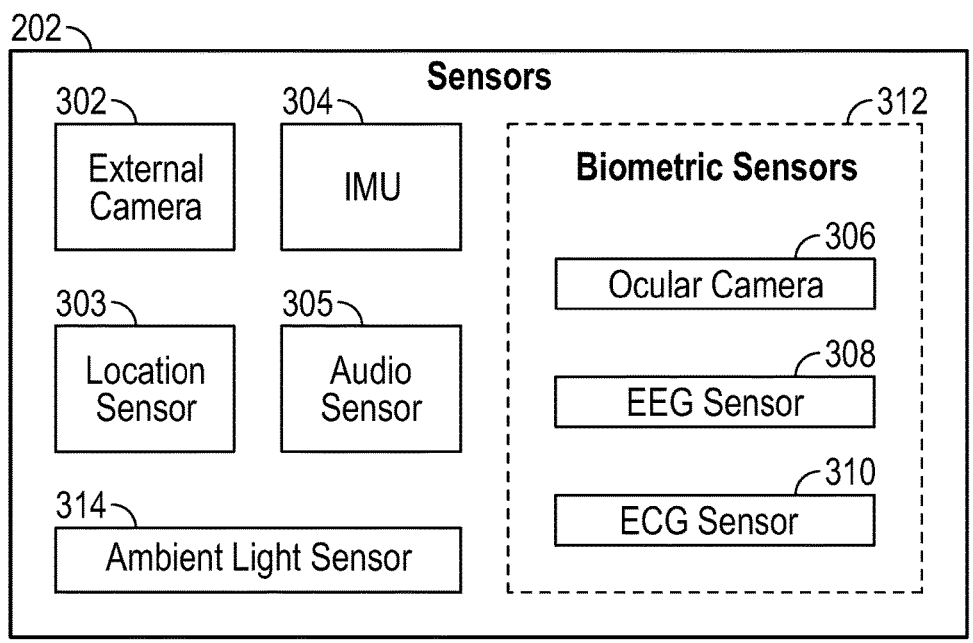
FIG. 3 is a block diagram illustrating examples of sensors.

FIG. 3 is a block diagram illustrating examples of sensors. For example, the sensors 202 may include an external camera 302, a location sensor 303, an IMU 304, an audio sensor 305, an ambient light sensor 314, and biometric sensors 312. It is noted that the sensors 202 described herein are for illustration purposes. Sensors 202 are thus not limited to the ones described.

The external camera 302 includes an optical sensor(s) (e.g., camera) that may encompass different spectrums. For example, the external camera 302 may include an infrared camera or a full-spectrum camera. The external camera 302 may include rear-facing camera(s) and front-facing camera(s) disposed in the HMD 101. The front-facing camera(s) may be used to capture a front field of view of the HMD 101 while the rear-facing camera(s) may be used to capture a rear field of view of the HMD 101. The pictures captured with the front- and rear-facing cameras may be combined to recreate a 360-degree view of the physical environment 114 around the HMD 101.

The location sensor 303 may determine a geolocation of the HMD 101 using a variety of techniques such as near field communication, GPS, Bluetooth, Wi-Fi. For example, the location sensor 303 may generate geographic coordinates of the HMD 101.

The IMU 304 may include a gyroscope and an inertial motion sensor to determine an orientation and movement of the HMD 101. For example, the IMU 304 may measure the velocity, orientation, and gravitational forces on the HMD 101. The IMU 304 may also detect a rate of acceleration using an accelerometer and changes in angular rotation using a gyroscope.

The audio sensor 305 may include a microphone. For example, the microphone may be used to record a voice command from the user (e.g., user 102) of the HMD 101. In other examples, the microphone may be used to measure an ambient noise (e.g., measure intensity of the background noise, identify specific type of noises such as explosions or gunshot noises).

The ambient light sensor 314 may determine an ambient light intensity around the HMD 101. For example, the ambient light sensor 314 measures the ambient light in a room in which the HMD 101 is located.

The biometric sensors 312 include sensors configured to measure biometric data unique to the user 102 of the HMD 101. In one example embodiment, the biometric sensors 312 include an ocular camera 306, an EEG (electroencephalogram) sensor 308, and an ECG (electrocardiogram) sensor 310. It is noted that the biometric sensors 312 described herein are for illustration purposes. Biometric sensors 312 are thus not limited to the ones described.

In one example embodiment, the ocular camera 306 is directed towards one or more eyes of the user 102. The ocular camera tracks a size of an iris, an eye ball orientation, and curvature of a lens of the user's one or more eyes. With these inputs, the user's eye sight direction, focus position, as well as a duration of the focus are monitored.

In another example embodiment, the ocular camera 306 includes an infrared (IR) camera configured to capture an image of a retina of the user 102. The IR camera may be used to perform a retinal scan to map unique patterns of the retina of the user 102. Blood vessels within the retina absorb light more readily than the surrounding tissue in the retina and therefore can be identified with IR lighting. The IR camera may cast a beam of IR light into the user's eye as the user 102 looks through the display 204 (e.g., lenses) towards virtual objects rendered in the display 204. The beam of IR light traces a path on the retina of the user 102. Because retinal blood vessels absorb more of the IR light than the rest of the eye, the amount of reflection varies during the retinal scan. The pattern of variations may be used as a biometric data unique to the user 102.

In another example embodiment, the ocular camera 306 may be a camera configured to capture an image of the iris in the eye of the user 102. In response to the amount of light entering the eye, muscles attached to the iris expand or contract the aperture at the center of the iris, known as the pupil. The expansion and contraction of the pupil depends on the amount of ambient light. The ocular camera 306 may use iris recognition as a method for biometric identification. The complex pattern on the iris of the eye of the user 102 is unique and can be used to identify the user 102. The ocular camera 306 may cast infrared light to acquire images of detailed structures of the iris of the eye of the user 102. Biometric algorithms may be applied to the image of the detailed structures of the iris to identify the user 102.

In another example embodiment, the ocular camera 306 includes an IR pupil dimension sensor that is pointed at an eye of the user 102 to measure the size of the pupil of the user 102. The IR pupil dimension sensor may sample the size of the pupil (e.g., using an IR camera) on a periodic basis or based on predefined triggered events (e.g., the user 102 walks into a different room, sudden changes in the ambient light, or the like).

The EEG sensor 308 includes, for example, electrodes that, when in contact with the skin of the head of the user 102, measure electrical activity of the brain of the user 102. The EEG sensor 308 may also measure the electrical activity and wave patterns through different bands of frequency (e.g., Delta, Theta, Alpha, Beta, Gamma, Mu). EEG signals may be used to authenticate the user 102 based on fluctuation patterns unique to the user 102.

The ECG sensor 310 includes, for example, electrodes that measure a heart rate of the user 102. In particular, the ECG sensor 310 measures the cardiac rhythm of the user 102. A biometric algorithm is applied to the user 102 to identify and authenticate the user 102. In one example embodiment, the EEG sensors 308 and ECG sensor 310 may be combined into a same set of electrodes to measure both brain electrical activity and heart rate. The set of electrodes may be disposed around the helmet so that the set of electrodes comes into contact with the skin of the user 102 when the user 102 wears the helmet 101.

Referring back to FIG. 2, the display 204 may include a display surface or lens capable of displaying AR content (e.g., images, video) generated by the processor 212. The display 204 may be transparent so that the user 102 can see through the display 204 (e.g., such as in a head-up display).

The storage device 208 stores a database of reference biometric data, corresponding user identification, and user privilege level. The reference biometric data may include biometric data that was previously captured and associated with a user during a configuration process. The reference biometric data may include a set of biometric data associated with each location of the virtual object in the display 204. In another example, the reference biometric data may include a set of biometric data associated with each virtual object rendered in the display 204. The reference biometric data may include a composite biometric data based on the sets of biometric data. The reference biometric data may include a unique identifier based on the biometric data of the user 102. The user identification may include the name and title of the user 102 (e.g., John Doe, VP of engineering). The user privilege level may identify which content the user 102 may have access to (e.g., access level 5 means that the user 102 may have access to content in virtual objects that are tagged with level 5). Other tags or metadata may be used to identify the user privilege level (e.g., "classified", "top secret", "public").

The storage device 208 may also store a database of identifiers of wearable devices capable of communicating with the HMD 101. In another embodiment, the database may also include visual references (e.g., images) and corresponding experiences (e.g., 3D virtual objects, interactive features of the 3D virtual objects). The database may include a primary content dataset, a contextual content dataset, and a visualization content dataset. The primary content dataset includes, for example, a first set of images and corresponding experiences (e.g., interaction with 3D virtual object models). For example, an image may be associated with one or more virtual object models. The primary content dataset may include a core set of images or the most popular images determined by the server 110. The core set of images may include a limited number of images identified by the server 110. For example, the core set of images may include the images depicting covers of the ten most viewed devices and their corresponding experiences (e.g., virtual objects that represent the ten most sensing devices in a factory floor). In another example, the server 110 may generate the first set of images based on the most popular or often scanned images received at the server 110. Thus, the primary content dataset does not depend on objects A 116, B 118 or images scanned by the HMD 101.

The contextual content dataset includes, for example, a second set of images and corresponding experiences (e.g., three-dimensional virtual object models) retrieved from the server 110. For example, images captured with the HMD 101 that are not recognized (e.g., by the server 110) in the primary content dataset are submitted to the server 110 for recognition. If the captured image is recognized by the server 110, a corresponding experience may be downloaded at the HMD 101 and stored in the contextual content dataset. Thus, the contextual content dataset relies on the contexts in which the HMD 101 has been used. As such, the contextual content dataset depends on objects or images scanned by the AR application 214 of the HMD 101.

In one example embodiment, the HMD 101 may communicate over the network 108 with the server 110 to access a database of reference biometric data or identifiers at the server 110 to compare with the biometric data of the user 102 and authenticate the user 102. In another example embodiment, the HMD 101 retrieves a portion of a database of visual references, corresponding 3D virtual objects, and corresponding interactive features of the 3D virtual objects.

As discussed earlier, present solutions that involve video or audio responses to a user with a wearable device are insufficient or may obstruct the view that is undesirable. A need exists for alerting the user in other means. Wearable devices, such as the DAQRI Smart Helmet, include displays for communicating information or otherwise alerting the user. In some cases, the display is retractable and/or there may be situations where AR content may obstruct the view of the user in a way that could be undesirable or unsafe. There is a need for a non-visual means of alerting the user when visual display is undesirable.

Figure 4:
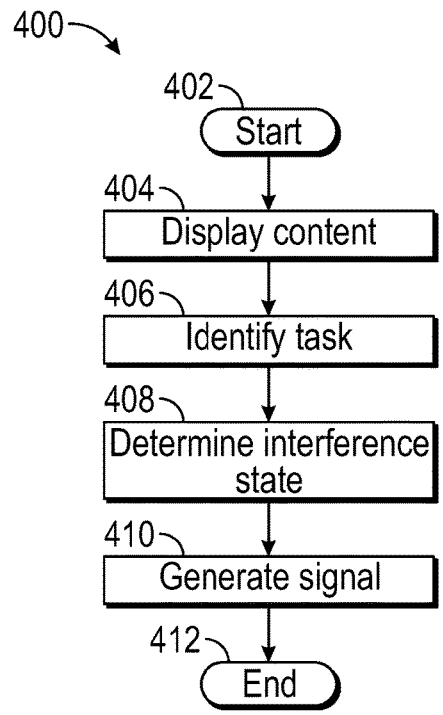
FIG. 4 is a flow diagram illustrating an example embodiment of a method for detecting a user status and providing a signal corresponding to the user status.

FIG. 4 is a flowchart illustrating a method 400 according to one embodiment to facilitate providing and determining the interference status of the task of the user, and putting on corresponding visual indications.

At block 404, virtual content is displayed in a display of the device.

At block 406, the device identifies a present task of the user. The task may be identified based on a user input or identification of a task (e.g., changing an air filter of an engine). In another example, the task may be determined based on a combination of an identification of a physical object being manipulated by the user of the device. For example, the user turning a switch of a particular device.

At block 408, the device determines an interference state of the user based on the task of the user, and the amount of virtual content displayed in the display of the device.

At block 410, the device generates a signal (e.g., wireless, visual, audio) to other HMD to alert other users that the user of the device is focused on a task and is not to be interrupted or distracted. The device may define predetermined user states and corresponding signal to indicate a level of interference (e.g., do not disturb, important communication only, ok to interact). For example, a user may be performing a detailed task or a task that requires uninterrupted focus. One embodiment is to prevent interruption from another person or external stimulus. Consequently, if a condition has been detected at block 408, based on previously discussed sensors, the device initiates a visual or Augmented Reality indicator at block 410. An example of the displays will be discussed in connection with FIG. 6. One example of an Augmented Reality indicator could be a fence around the user to define a working boundary and serve as an image to warn others to not interrupt the user. One skilled in the art appreciates other AR indicators such as a Red Stop Sign, Warning text, etc.

Figure 5:
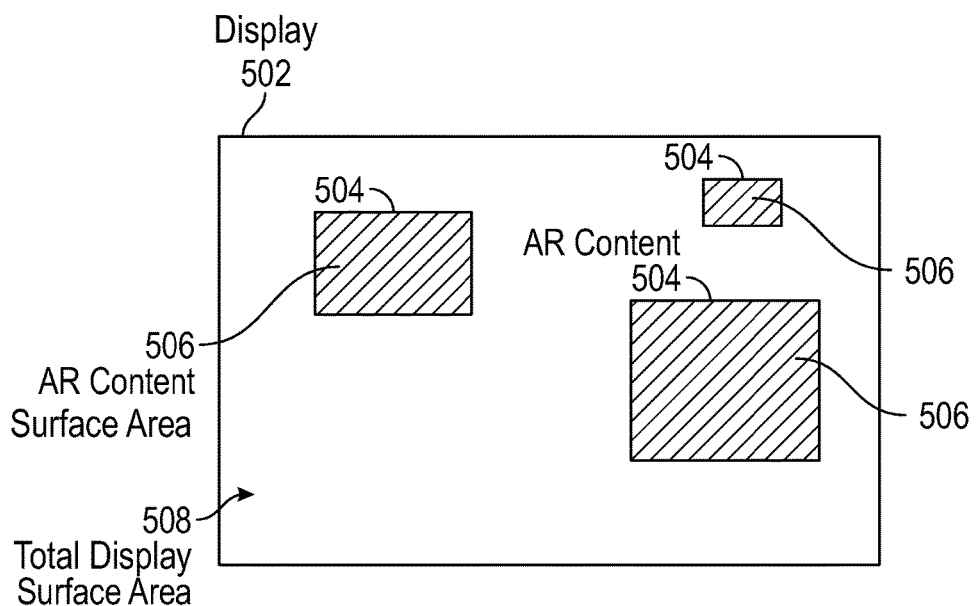
FIG. 5 is a block diagram illustrating an example of a display of a wearable device.

FIG. 5 is a block diagram illustrating an example of a display of a wearable device. The display 204 of the device 101 includes a total display surface area 508. Virtual or AR content 504, 506 is displayed on the display 204. The device 101 computes a total surface area occupied by the AR content displayed in the display 204 and determines a ratio or percentage of display surface occupied by the Virtual or AR content. The ratio can be used to determine a level of focus of the user.

Figure 6:
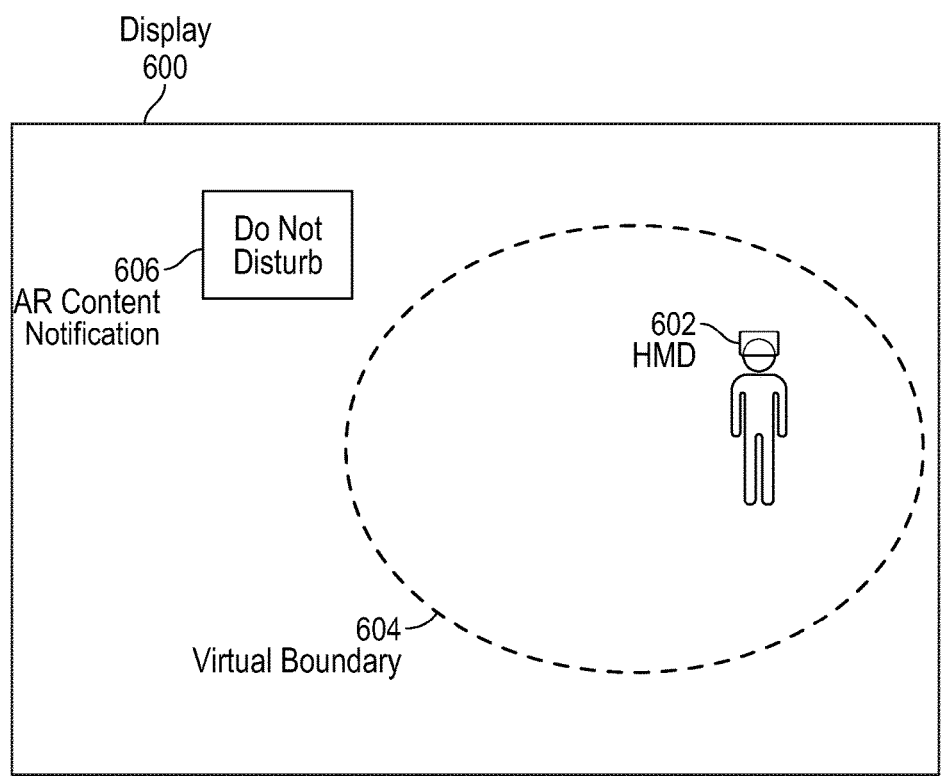
FIG. 6 is a block diagram illustrating an example of augmented reality content in a display.

FIG. 6 is a block diagram illustrating an example of augmented reality content in a display of an HMD external to the HMD 602. A virtual boundary 604 is defined as an area around the HMD 602. The dimensions or area of the virtual boundary 604 may vary depending on the level of focus of the user and the task being performed by the user of the HMD 602. AR content notification 606 (e.g., virtual sign) may be displayed in the display of other HMDs to warn other users that the user of the HMD 602 is not to be disturbed.

Figure 7A:
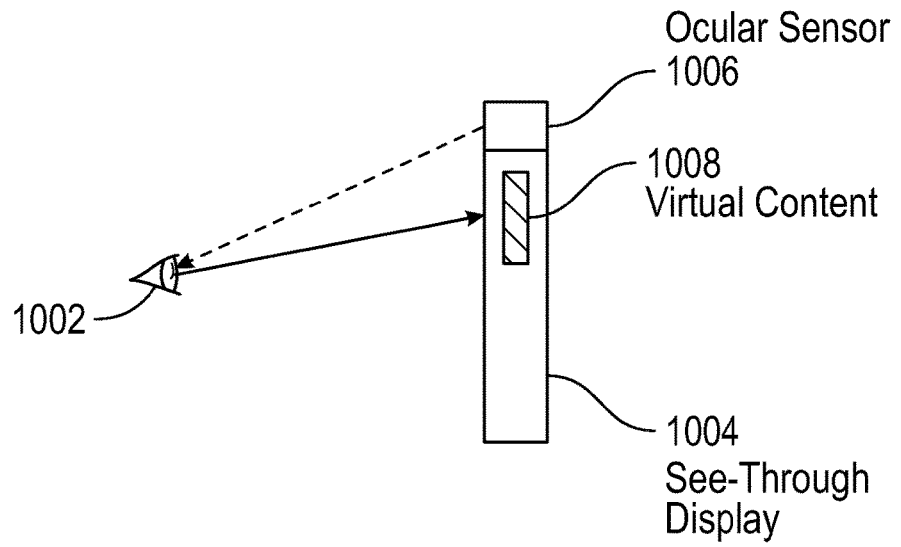
FIG. 7A is a block diagram illustrating a side view of an example of an eye gaze sensor and a display.

FIG. 7A is a block diagram illustrating using an ocular sensor to measure a focus level, according to an example embodiment. An eye 1002 of the user 102 stares at virtual content 1008 (e.g., a picture of a balloon) displayed in the transparent display 1004. The display 204 of FIG. 2 may include the transparent display 1004. The AR application 214 of FIG. 2 may be used to generate the virtual content 1008 in a top part of the transparent display 1004. The ocular sensor 1006 may include a camera aimed towards the eye 1002. The ocular sensor 1006 measures a gaze and determines how long the user 102 is staring at the virtual content 1008. The focus level is determined based on the length of time the user 102 is starting at the virtual content 1008. In another embodiment, the camera may be used to capture an image of the structure of the iris or the blood vessel patterns inside the retina in the eye 1002. The ocular sensor 1006 captures an image of the iris or blood vessels in the retina when the eye 1002 is aimed towards the virtual content 1008. This captured image is associated with the relative location of the virtual content 1008 in the transparent display 1004.

Figure 7B:
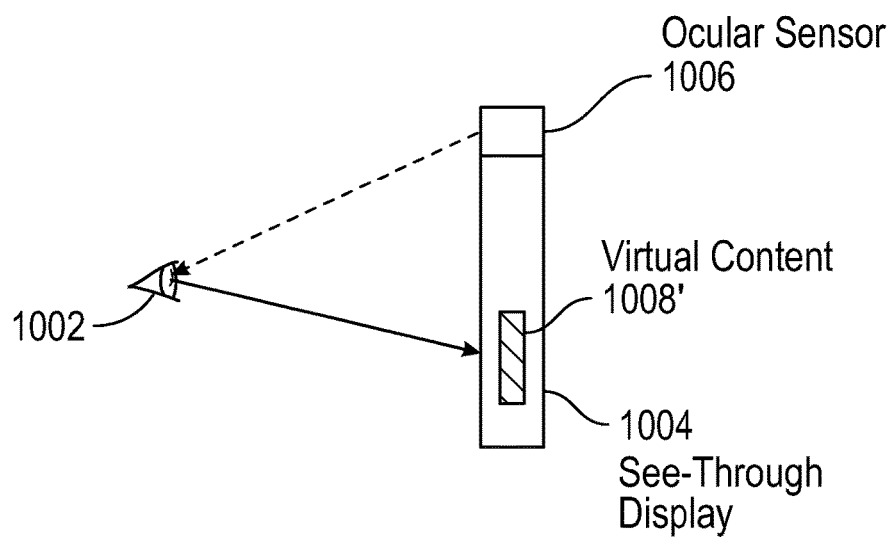
FIG. 7B is a block diagram illustrating a side view of an example of an eye gaze sensor and a display.

FIG. 7B is a block diagram illustrating using an ocular sensor to measure a focus level, according to another example embodiment. The AR application 214 generates another virtual content 1008' that is displayed in a different location of the transparent display 1004. For example, the virtual content 1008' may be displayed at a bottom part of the transparent display 1004. The virtual content 1008' may be different from the virtual content 1008. In another example, the virtual content 1008' may include the same content as virtual content 1008. The ocular sensor 1006 measures a gaze and determines how long the user 102 is staring the virtual content 1008'. The focus level is determined based on the length of time the user 102 is starting at the virtual content 1008'. In another embodiment, the ocular sensor 1006 captures an image of the iris or blood vessels in the retina when the eye 1002 is aimed towards the virtual content 1008'. This captured image is associated with the relative location of the virtual content 1008' in the transparent display 1004. In one example embodiment, the eye gaze refers to a direction (or even a location) at which the gaze is directed.

Figure 8A:
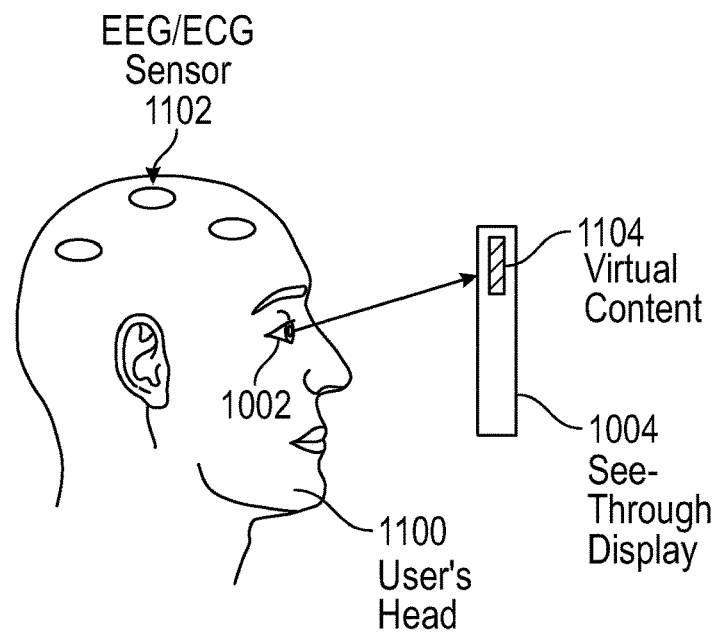
FIG. 8A is a block diagram illustrating a side view of an example of an EEG sensor and a display.

FIG. 8A is a block diagram illustrating measuring biometric data, according to an example embodiment. The eye 1002 of a user's head 1100 stares at virtual content 1104 (e.g., a picture of a balloon) displayed in the transparent display 1004. The AR application 214 of FIG. 2 may be used to generate the virtual content 1104 in the transparent display 1004. EEG/ECG sensor(s) 1102 may be connected to the user's head 1110 to measure brain activity and heart rate pattern. The interference state indicator application 216 generates a signal identifying a focus or distraction state of the user based on the biometric data from the EEG/ECG sensor(s) 1102.

Figure 8B:
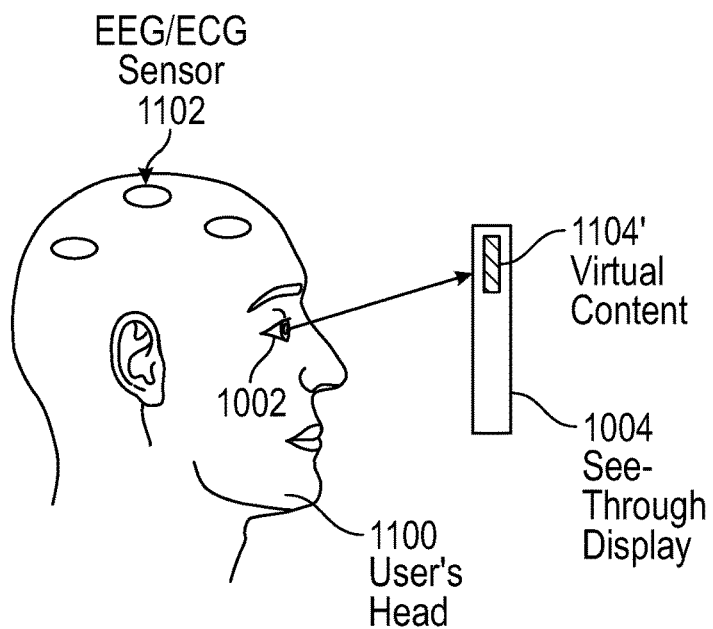
FIG. 8B is a block diagram illustrating a side view of an example of an EEG sensor and a display.

FIG. 8B is a block diagram illustrating measuring biometric data, according to another example embodiment. The AR application 214 generates another virtual content 1104' (in the same or different location of the transparent display 1004). The virtual content 1104' may be the same or different from the virtual content 1104. EEG/ECG sensor(s) 1102 measure brain activity and heart rate pattern from the user while the user is looking at virtual content 1104'. The interference state indicator application 216 generates a signal identifying a focus or distraction state of the user based on the biometric data from the EEG/ECG sensor(s) 1102.

Figure 9A:
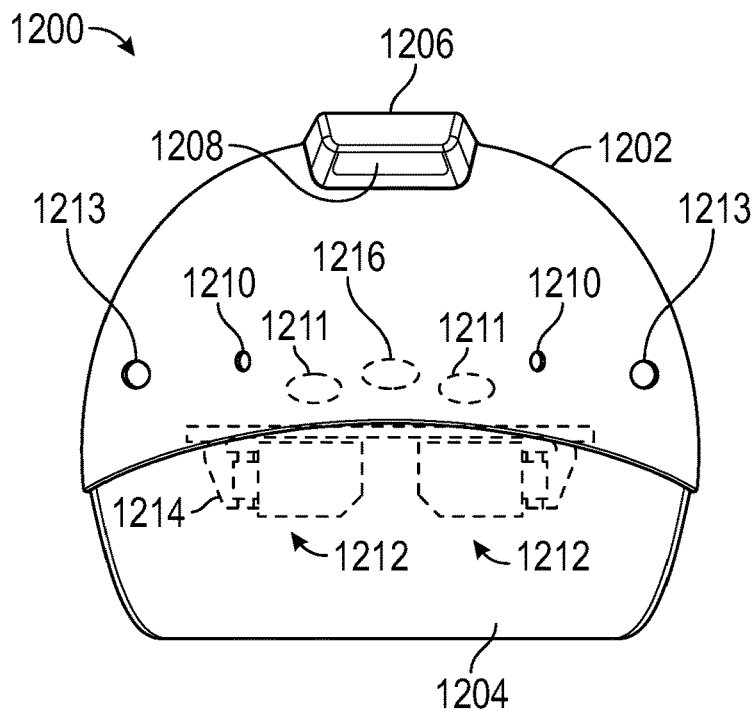
FIG. 9A is a block diagram illustrating a front view of a head mounted device, according to some example embodiments.
Figure 9B:
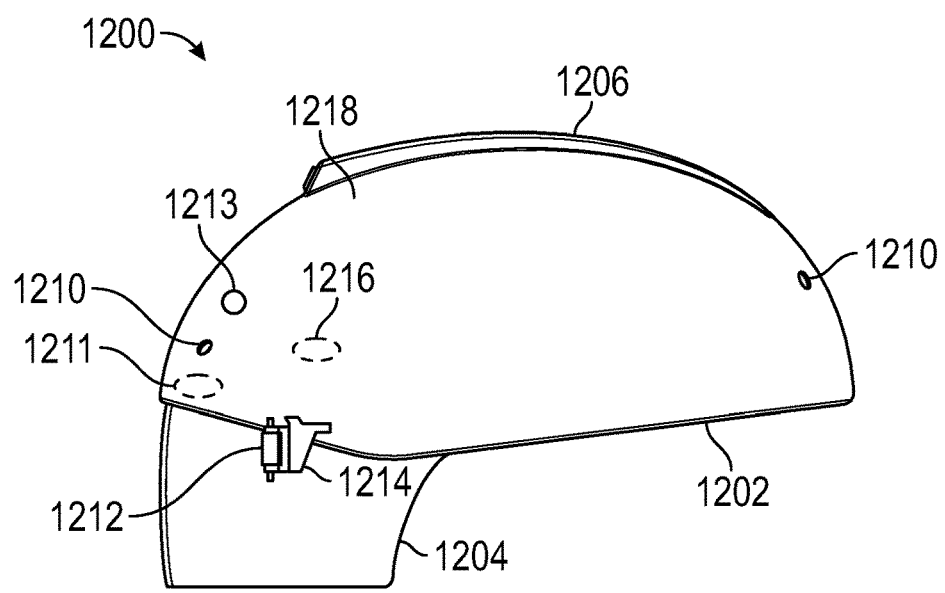
FIG. 9B is a block diagram illustrating a side view of the head mounted device of FIG. 9A.

FIG. 9A is a block diagram illustrating a front view of a head mounted device 1200, according to some example embodiments. FIG. 9B is a block diagram illustrating a side view of the head mounted device 1200 of FIG. 9A. The HMD 1200 may include HMD 101 of FIG. 1.

The HMD 1200 includes a helmet 1202 with an attached visor 1204. The helmet 1202 may include sensors 202 (e.g., optical and audio sensors 1208 and 1210 provided at the front, back, and a top section 1206 of the helmet 1202). Display lenses 1212 are mounted on a lens frame 1214. The display lenses 1212 include the display 204 of FIG. 2. The helmet 1202 further includes ocular cameras 1211. Each ocular camera 1211 is directed to an eye of the user 102 to capture an image of the iris or retina. Each ocular camera 1211 may be positioned on the helmet 1202 above each eye and facing a corresponding eye. The helmet 1202 also includes EEG/ECG sensors 1216 to measure brain activity and heart rate pattern of the user 102.

In another example embodiment, the helmet 1202 also includes lighting elements in the form of LED lights 1213 on each side of the helmet 1202. An intensity or brightness of the LED lights 1213 is adjusted based on the dimensions of the pupils of the user 102.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor 212 or a group of processors 212) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 212 or other programmable processor 212) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 212 configured using software, the general-purpose processor 212 may be configured as respective different hardware modules at different times. Software may accordingly configure a processor 212, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors 212 that are temporarily configured (e.g., by software) or permanently configured to perform the relevant operations. Whether temporarily or permanently configured, such processors 212 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 212 or processor-implemented modules. The performance of certain of the operations may be distributed among the one or more processors 212, not only residing within a single machine, but deployed across a number of machines. In some example embodiments, the processor or processors 212 may be located in a single location (e.g., within a home environment, an office environment or as a server farm), while in other embodiments the processors 212 may be distributed across a number of locations.

The one or more processors 212 may also operate to support performance of the relevant operations in a "cloud computing" environment or as a "software as a service" (SaaS). For example, at least some of the operations may be performed by a group of computers (as examples of machines including processors 212), these operations being accessible via a network 108 and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 212, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network 108.

In example embodiments, operations may be performed by one or more programmable processors 212 executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers 110. A client and server 110 are generally remote from each other and typically interact through a communication network 108. The relationship of client and server 110 arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 212), or a combination of permanently and temporarily configured hardware may be a design choice. Below are set out hardware (e.g., machine) and software architectures that may be deployed, in various example embodiments.

Example Machine Architecture and Machine-Readable Medium

FIG. 6 is a block diagram of a machine in the example form of a computer system 1300 within which instructions 1324 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server 110 or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions 1324 (sequential or otherwise) that specify actions to be taken by that machine. Further, while only a single machine is illustrated, the term "machine" shall also be taken to include any collection of machines that individually or jointly execute a set (or multiple sets) of instructions 1324 to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation (or cursor control) device 1314 (e.g., a mouse), a disk drive unit 1316, a signal generation device 1318 (e.g., a speaker) and a network interface device 1320.

Machine-Readable Medium

The disk drive unit 1316 includes a computer-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media 1322. The instructions 1324 may also reside, completely or at least partially, within the static memory 1306.

While the machine-readable medium 1322 is shown in an example embodiment to be a single medium, the term "machine-readable medium" may include a single medium or multiple media (e.g., a centralized or distributed database, and/or associated caches and servers 110) that store the one or more instructions 1324 or data structures. The term "machine-readable medium" shall also be taken to include any tangible medium that is capable of storing, encoding or carrying instructions 1324 for execution by the machine and that cause the machine to perform any one or more of the methodologies of the present embodiments, or that is capable of storing, encoding or carrying data structures utilized by or associated with such instructions 1324. The term "machine-readable medium" shall accordingly be taken to include, but not be limited to, solid-state memories, and optical and magnetic media. Specific examples of machine-readable media 1322 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1324 may further be transmitted or received over a communications network 1326 using a transmission medium. The communications network 1326 may include the same network 108 of FIG. 1. The instructions 1324 may be transmitted using the network interface device 1320 and any one of a number of well-known transfer protocols (e.g., HTTP). Examples of communications networks 1326 include a LAN, a WAN, the Internet, mobile telephone networks, POTS networks, and wireless data networks (e.g., WiFi and WiMax networks). The term "transmission medium" shall be instructions 1324 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A device comprising:
a biometric sensor configured to measure biometric information of a user of the device;
a display configured to display augmented reality (AR) content;
a light source configured to output any of a plurality of visual signals; and
one or more hardware processors comprising a disruption indicator application, the disruption indicator application configured to perform operations comprising:
identifying a task being performed by the user of the device;
determining a disruption level based on a combination of the AR content, the task, and the biometric information; and
causing the light source to output a visual signal corresponding to the disruption level and selected from the plurality of visual signals, the visual signal being configured to visually alert other users of other devices to avoid engaging the user of the device.

2. The device of claim 1, wherein the operations further comprise:
identifying, using a camera of the device, an eye gaze of the user of the device,
wherein the disruption level is further determined based on the eye gaze of the user.

3. The device of claim 1, wherein the biometric information includes a combination of a body temperature of the user, a heart rate of the user, electroencephalogram (EEG) data of the user, and an electrocardiogram (ECG) of the user.

4. The device of claim 1, wherein the disruption level is determined based on a combination of a percentage of a surface area of the display that is used by the AR content, a complexity level of the task, and an engagement level of the user,
wherein the engagement level is based on the biometric information,
wherein a disruption level increases with a higher percentage of the surface area that is used by the AR content, a higher complexity level of the task, and a higher engagement level.

5. The device of claim 1, wherein the operations further comprise:
forming a geographical boundary based on the disruption level, the geographic boundary identifying an area for users of other devices to avoid, the area being centered around the user's geographic location, a larger area corresponding to a higher disruption level, and a smaller area corresponding to a lower disruption level.

6. The device of claim 5, wherein the hardware processor is configured to:
communicating the geographical boundary to at least one of a second device and a server, the second device being configured to display a virtual boundary corresponding to the geographical boundary in a display of the second device, the virtual boundary appearing centered around the user's geographic location.

7. The device of claim 1, wherein the visual signal includes light of one or more colors, each color corresponding to the disruption level.

8. The device of claim 1, wherein the visual signal includes a flashing light with a frequency corresponding to the disruption level.

9. The device of claim 1, wherein the visual signal includes light with an intensity corresponding to the disruption level.

10. The device of claim 1, wherein the operations further comprise:
adjusting the disruption level based on a level of progress of the task.

11. A method comprising:
measuring biometric information of a user of the device using a biometric sensor of the device;
displaying augmented reality (AR) content in a display of the device;
identifying a task being performed by the user of the device;
determining a disruption level based on a combination of the AR content, the task, and the biometric information; and
generating, using a light source of the device, a visual signal corresponding to the disruption level, the visual indicator configured to visually alert other users of other devices to avoid engaging the user of the device.

12. The method of claim 11, wherein the operations further comprise:

identifying, using a camera of the device, an eye gaze of the user of the device, wherein the disruption level is further determined based on the eye gaze of the user.

13. The method of claim 11, wherein the biometric information includes a combination of a body temperature of the user, a heart rate of the user, an electroencephalogram (EEG) data of the user, and an electrocardiogram (ECG) of the user.

14. The method of claim 11, wherein the disruption level is determined based on a combination of a percentage of a surface area of the display that is used by the AR content, a complexity level of the task, and an engagement level of the user, wherein the engagement level is based on the biometric information, wherein a disruption level increases with a higher percentage of the surface area that is used by the AR content, a higher complexity level of the task, and a higher engagement level.

15. The method of claim 11, further comprising:

forming a geographical boundary based on the disruption level, the geographic boundary identifying an area for users of other devices to avoid, the area being centered around the user's geographic location, a larger area corresponding to a higher disruption level, and a smaller area corresponding to a lower disruption level.

16. The method of claim 15, further comprising:

communicating information of the geographical boundary to at least one of a second device and a server, the second device being configured to display a virtual boundary corresponding to the geographical boundary in a display of the second device, the virtual boundary appearing centered around the user's geographic location.

17. The method of claim 11, wherein:

the visual signal includes light of one or more colors, each color corresponding to the disruption level.

18. The method of claim 11, wherein:

the visual signal includes a flashing light with a frequency corresponding to the disruption level.

19. The method of claim 11, wherein:

the visual signal includes light with an intensity corresponding to the disruption level.

20. A non-transitory machine-readable medium comprising instructions that, when executed by one or more processors of a machine, cause the machine to perform operations comprising:

measuring biometric information of a user of the device using a biometric sensor of the device;

displaying augmented reality (AR) content in a display of the device;

identifying a task being performed by the user of the device;

determining a disruption level based on a combination of the AR content, the task, and the biometric information; and generating, using a light source of the device, a visual signal corresponding to the disruption level, the visual indicator configured to visually alert other users of other devices to avoid engaging the user of the device.

* * * * *